United States Patent [19]

Graham et al.

[11] 4,282,633

[45] Aug. 11, 1981

[54] LINE DIVIDER

[76] Inventors: Kenneth Z. Graham, Rt. 2, Dawsonville, Ga. 30534; Johnny R. Graham, Rt. 8, Gainesville, Ga. 30501

[21] Appl. No.: 93,747

[22] Filed: Nov. 13, 1979

[51] Int. Cl.³ .............................................. A22C 21/00

[52] U.S. Cl. ........................................... 17/45; 17/11; 198/441; 198/436; 198/477; 198/680

[58] Field of Search ............... 17/11, 24, 45; 198/440, 198/441, 436, 477, 680

[56] References Cited

U.S. PATENT DOCUMENTS

| | | | |
|---|---|---|---|
| 2,923,395 | 2/1960 | Von Hofe | 198/440 X |
| 3,416,186 | 12/1968 | Zebarth et al. | 17/11 |
| 3,766,602 | 10/1973 | Bottumley et al. | 17/11 |
| 4,069,908 | 1/1978 | Johnson et al. | 198/440 X |

*Primary Examiner*—Willie G. Abercrombie
*Attorney, Agent, or Firm*—Jones, Thomas & Askew

[57] ABSTRACT

A line of poultry suspended on hangers and moving in alignment in series through a processing plant is divided by engaging and urging alternate one of the engaged hangers laterally with respect to the direction of movement of the hangers along the conveyor line, substantially without deflecting the hangers or the poultry carried thereby from their longitudinal movement with the conveyor line. In one embodiment, paddles carried on a continuous separator conveyor move along a path that diverges laterally beneath the conveyor line and the surfaces of the paddles which engage alternate ones of the hangers are oriented at an angle that does not impart movement to the hangers or the poultry carried thereby along the conveyor line. In another embodiment, a helical engaging member of increasing radius is located beneath the conveyor line and rotates to engage and to progressively urge alternate ones of the hangers laterally with respect to the conveyor line without imparting longitudinal movement to the hangers or poultry carried thereby.

9 Claims, 5 Drawing Figures

74
75
22
18
76
71
69
66
65
38
43
70
68
64
49
73
44
45
40
42
72
50
51
46
48
54
55

LINE DIVIDER

FIELD OF THE INVENTION

The invention disclosed herein relates to a line divider for a poultry processing plant wherein birds suspended on hangers or shackles and moving in alignment in series through a processing plant are divided into two lines for inspection. One of a multiple number of a series of the hangers is urged laterally with respect to the other hangers so that the bird carried by the laterally projected hanger is displaced toward an inspector positioned beside the processing line and the bird to be inspected is segregated from the other birds and the attention of inspector is directed to the bird that he is to inspect.

In a poultry processing plant wherein birds such as chickens, turkeys, etc., are killed, defeathered, eviserated and otherwise prepared for market, the birds are usually suspended in a head-down attitude on an overhead conveyor line and most of the processing steps take place on the birds with the birds moving on the conveyor line through the processing plant.

One of the most important processing steps in a poultry processing plant is the step of eviscerating the birds, wherein the vent of each bird is opened and a spoon or loop is inserted into the cavity and extracts the visera therefrom and lays the visera over the outside surface of the bird. It has become common practice to inspect each bird after it has been eviserated and while the visera is still hanging from the bird so that the inspector can determine the condition of the visera of each bird before it is separated from the bird. In this way, the inspector can identify a diseased bird from its visera and cause the diseased bird to be removed from the processing line.

While the inspection of eviscerated birds moving along a poultry processing line has become common practice under the laws of the United States, modern poultry processing plants have the capacity for running at a faster rate than the inspectors can function. It has therefore become desirable to divide the birds of a single conveyor line into two adjacent lines so that every other bird, or one of a multiple number of a series of the birds, is projected out from the line toward the inspector's station and an inspector can inspect the projected birds as the birds pass by. After those birds have passed by the inspector the line division is reversed so that the others of the birds are divided out and projected toward a second inspector to enable the second inspector to inspect the remaining birds.

The prior art line dividers have included a rotatable element driven by the conveyor line which includes paddles or other projecting elements that rotate into engagement with every other hanger that carries a bird, to thrust the hanger laterally with respect to the conveyor line, and a guide rod which receives the laterally displaced hangers and which extends along the conveyor line so that the laterally displaced hangers are carried in their displaced positions with respect to the conveyor line on beyond the rotatable element and through the inspection station. While these prior art devices have been successful to some extent, they frequently cause problems in the conveyor line. For example, the prior art devices tend to retard the longitudinal movement of the hangers and the birds when the hangers first engage the rotatable elements, causing the hangers to tangle with one another and causing the birds to engage one another and to become entangled with each other or with an adjacent hanger. In some instances the birds are partially or completely dislodged from their hangers so that the subsequent processing steps cannot be performed on the birds and in other instances the hangers must be physically separated from one another. Additionally, the retardation of the hangers by the rotatable element of the line divider consumes power from the conveyor line.

SUMMARY OF THE INVENTION

Briefly described, the present invention comprises a line divider system for poultry processing plants wherein the hangers suspended from an overhead conveyor and which support birds in an inverted attitude are moved in series through various processing stations. Alternate ones of the hangers and the birds carried thereby are displaced laterally with respect to the direction of movement of the conveyor substantially without imparting longitudinal forces to the displaced hangers. The hangers are displaced laterally with respect to the conveyor by a surface that extends substantially parallel to the conveyor line and which progressively tilts the hanger outwardly from beneath the conveyor line so that its birds is projected toward an inspection station where a government inspector or other person can inspect the displaced birds while ignoring the birds that are not displaced.

In one embodiment of the invention a series of paddles or projecting elements are carried in spaced relationship on an endless displacement conveyor at the level of the hangers. One flight of the displacement conveyor is positioned so that it diverges outwardly from beneath the conveyor line and the paddles are arranged to engage alternate ones of the hangers as the paddles are moved along the diverging flight. The displacement conveyor is driven by the poultry conveyor and the engaging surfaces of the paddles of the displacement conveyor are oriented substantially parallel to the conveyor line as the paddles move along the diverging flight of the displacement conveyor, so that substantially no longitudinal forces are imparted by the paddles to the hangers that are displaced from beneath the conveyor line. The displaced hangers are passed to a guide rod which extends parallel to the conveyor line, and the hangers continue their movements along the guide rod so that the birds continue to be displaced and move through an inspection station.

In another embodiment of the invention a helical displacement element is located at the height of the hangers and is rotated by the conveyor line with its axis of rotation extending parallel to the conveyor line. Its helical surface progressively increases in radius from its axis of rotation so that it moves into the path of alternate ones of the hangers so as to engage and to progressively displace alternate ones of the hangers laterally out from the conveyor line, thereby projecting the hangers into the inspection station. The others of the hangers move between the flights of the helical displacement element and are not displaced. Optionally, a guide rod can be utilized in conjunction with the helical displacement element to continue the displacement of the guide rods beyond the helical displacement element and through an inspection station.

Thus, it is an object of this invention to provide a line divider system for laterally displacing one of a multiple number of hangers and birds suspended therefrom in a poultry processing line substantially without imparting longitudinal forces along the conveyor.

Another object of this invention is to provide a method and apparatus for reliably, expediently and accurately separating alternate ones of or one of a multiple number of a series of poultry hangers in a poultry conveyor line so that the birds carried thereby become laterally displaced from the other birds in the line and the separated birds can be conveniently inspected by a government inspector, or the like.

Other objects, features and advantages of the present invention will become apparent upon reading the following specification, when taking in conjunction with accompanying drawings.

DETAILED DESCRIPTION

Figure 1:
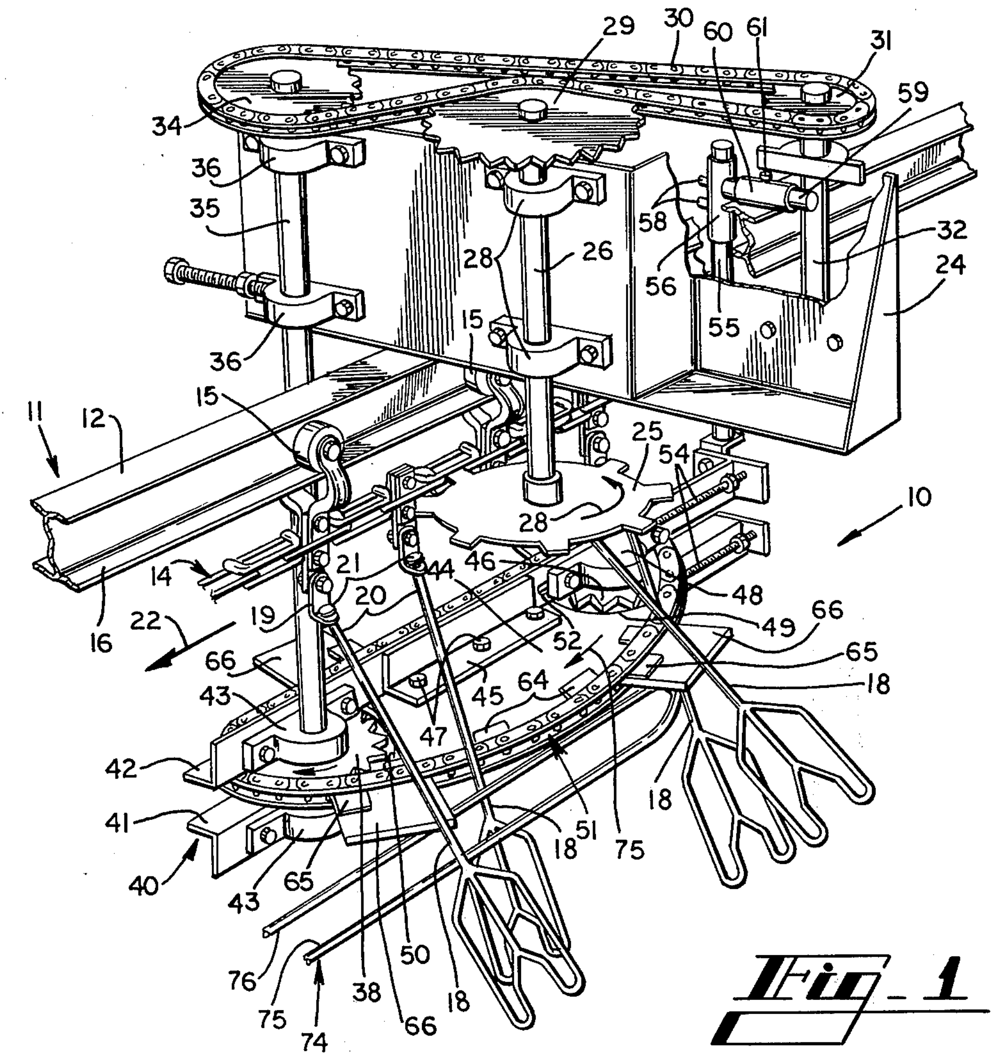
FIG. 1 is a perspective illustration of the line divider.

Referring now in more detail to the drawings, in which like numerals indicate like parts throughout the several views, FIG. 1 illustrates a line divider 10 for a poultry processing line 11. The poultry processing line 11 includes a guide rail 12, a conveyor chain 14, a plurality of trolleys 15 mounted on the lower flange 16 of rail 12 and a hanger or shackle 18 suspended from each trolley 15. Each trolley 15 includes a swivel 19 and each hanger includes a stem 20 that includes a cap 21 at its upper end with it stem extending through the swivel 19, so that the hanger 18 swings freely beneath its trolley 15. The conveyor chain 14 is driven by a motor (not shown) so that the trolleys and hangers move in the direction indicated by arrow 22 along the conveyor line.

Line divider 10 includes upper support frame 24 mounted on the upper flange of conveyor rail 12. Drive sprocket 25 is mounted on the lower end of drive shaft 26, and drive shaft 26 is rotatably mounted on upper support frame 24 by means of bearings 28. The teeth of drive sprocket 25 engage the links of conveyor chain 14, and rotational movement is imparted to the drive sprocket 25 and its vertically oriented drive shaft 26 as indicated by arrow 28. Sprocket 29 is mounted on the upper end of drive shaft 26 and engages continuous drive chain 30. Idler sprocket 31 is mounted on the upper end of idler shaft 32 rotatably mounted on upper support frame 24, and driven sprocket 34 is mounted on the upper end of driven shaft 35 and is rotatably supported by upper support frame 24 by bearings 36. The lower end of driven shaft 35 extends downwardly to a level below drive sprocket 25, and conveyor chain sprocket 38 is mounted on its lower end.

Line divider 10 includes a support frame 40 that includes a pair of parallel L-shaped support beams 41 and 42. Conveyor chain sprocket 38 rotates between L-shape support beams 41 and 42. Chain guide 44 is also located bewteen L-shape support beams 41 and 42 and the L-shape support beams 41 and 42 and chain guide 44 are connected together in a sandwiched relationship by angle irons 45 (only one shown) which are each connected to a support beam 41 or 42 and to opposite surfaces of chain guide 44 by bolts 47. Driven chain sprocket 46 is located at the other end of chain guide 44 and its shaft (not shown) is mounted in suitable bearings 48 mounted to the L-shape support beams 41 and 42. The lower end of driven shaft 35 is mounted in bearings 43 which are mounted on L-shape support beams 41 and 42.

Conveyor chain sprocket 38 and driven chain sprocket 46 are received in arcuate recesses 49 and 50 at opposite ends of the chain guide 44, and endless hanger divider chain 51 extends about sprockets 38 and 46 and about chain guide 44. The bearings 48 at one end of support frame 40 are movably mounted in slots 52 of each L-shape support beam 41 and 42 and the bearings can be accurately adjusted along the length of the L-shape support beams by means of adjusting screws 54. This applies the proper tension to endless hanger divider chain 51.

Support rod 55 is connected at its lower end to the upper L-shape support beam 42 and extends vertically upperwardly therefrom. The upper end of support rod 55 is telescopically received in vertical support sleeve 56 and is locked thereto by set screws 58. Horizontal support rod 59 is rigidly connected to and projects horizontally from vertical support sleeve 56 and extends through horizontal support sleeve 60 and is rigidly connected thereto by set screw 61. Horizontal support sleeve 60 is rigidly mounted to the upper surface of conveyor rail 12. With this arrangement, the height and lateral position of the entrance end of the line divider 10 can be adjusted with respect to the poultry processing line 11.

Endless hanger divider chain 51 includes a plurality of spaced chain guides 64 which project inwardly on both the top and bottom surfaces about chain guide 44 so as to guide the divider chain about the chain guide 44. Additionally, similar chain guide elements 65 are connected to divider chain 51 and project outwardly of the chain. Paddles 66 are rigidly mounted between chain guides 65 and move with divider chain 51 about chain guide 44. Each paddle (FIG. 2) includes a base edge 68 which abuts the links of divider chain 51, a leading edge 69, trailing edge 70 and outer engaging edge 71. Leading edge 69 is shorter than trailing edge 70, so that outer edge 71 is not parallel to inner edge 68 or to the divider chain.

Figure 2:
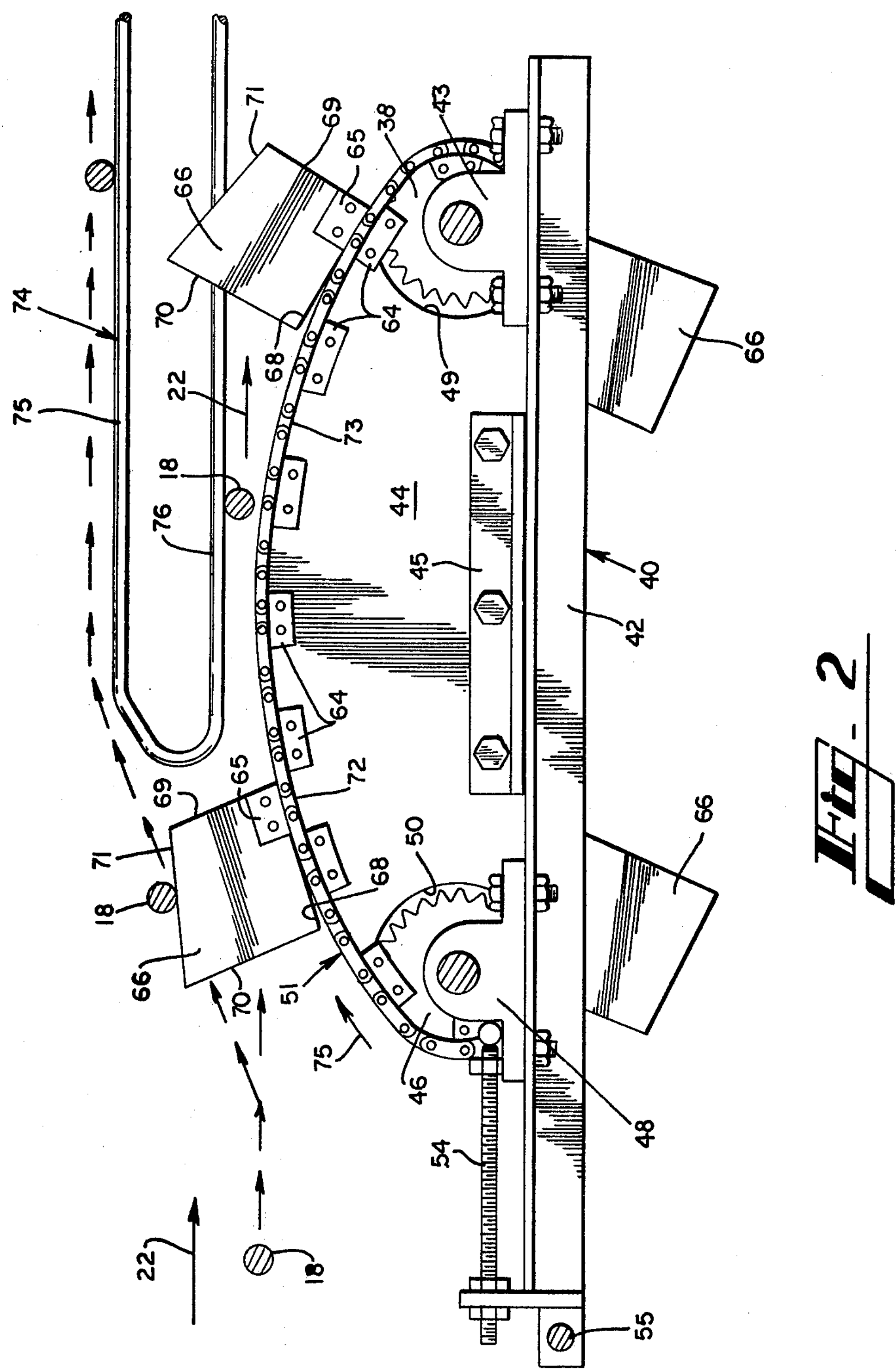
FIG. 2 is a top view of the line divider of FIG. 1.

As best illustrated in FIG. 2, the surface 72 of chain guide 44 which extends from arcuate recess 50 at a tangent with respect to driven chain sprocket 46 is oriented at an angle which diverges away from the direction of movement 22 of the conveyor line. As illustrated in the drawing, the angle at which the hanger divider chain follows the surface 72 from the longitudinal direction of movement of the conveyor line is approximately 25°. The angle that the outer edge 71 of each paddle 66 makes with respect to its inner edge 68 is also approximately 25°, and the angle of outer edge 71 is inverse with respect to the angle of outer edge 72 of chain guide 44 when the paddles move along the diverging flight of the divider chain 51. Thus, outer edge 71 of each paddle 66 becomes substantially parallel to the direction of movement 22 of the hangers 18 as the paddles move along the diverging flight of the divider chain.

Guide rod 74 is substantially U-shaped and includes outer leg 75 and inner leg 76 which are parallel to each other and which extend approximately parallel to the direction of movement 22 of the poultry processing line 11 at the level of the hangers.

When the poultry processing line is in motion and the conveyor chain 14 moves the trolleys 15 and their suspended hangers 18 in the direction of movement as indicated by arrow 22, the endless hanger divider chain 51 is moved in the direction indicated by arrow 75. The paddles 66 are spaced along the length of hanger divider chain 51 at intervals corresponding to one of a multiple number of the spacings of a series of the hangers 18. For example, the paddles 66 are illustrated in the drawing as being spaced apart a distance equal to the spacing of every other one of the hangers 18.

The timing of the movement of the paddles 66 is coordinated with the movement of the trolleys 15, so that a paddle 66 moves into engagement with a hanger 18 as the hangers approach the line divider 10. The paddles 66 rotate about divider chain sprocket 46 and begin their movement along the surface 72 of chain guide 44 preferably before the outer edge 71 engages a hanger 18. Since the outer edge 71 will be oriented approximately parallel to the direction of movement 22 of the hangers 18 along the conveyor lines, the edges 71 tend to displace the hangers 18 laterally with respect to the conveyor line, substantially without imparting any longitudinal movement to the hangers as they continue there movement along the conveyor line.

As the paddles 66 move further along the diverging path formed by the surface 72 of chain guide 44, the hangers 18 are displaced a distance sufficient to correspond to the outer surface of the outer leg 75 of guide rod 74. When the paddles begin their movement along the next surface 73 of chain guide 44 so that they move back toward conveyor chain sprocket 38, the outer edge 71 of each paddle withdraws from its hanger 18, and the stem 20 of each hanger continues to be guided by the outer leg 75 on parallel to the direction of movement 22 of the conveyor line. In this way, alternate ones of the hangers 18 are displaced laterally with respect to the conveyor line while the other alternate ones of the hangers continue without lateral displacement. The outer and inner legs 75 and 76 of the guide rod 74 maintain the hangers 18 in their separate paths as the hangers move on through an inspection station, where the birds carried by the hangers are inspected. Thus, the paddles 66 and hanger divider chain and their related components function as hanger displacement means for engaging and laterally displacing one of a multiple number of a series of the hangers and the birds carried thereby from the conveyor line.

Figure 5:
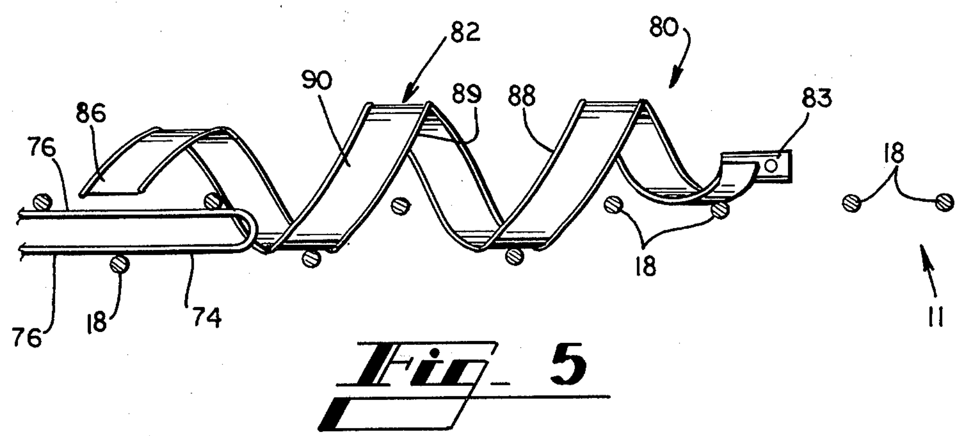
FIG. 5 is a top view of the helical displacement element of FIG. 3.
Figures 3, 4:
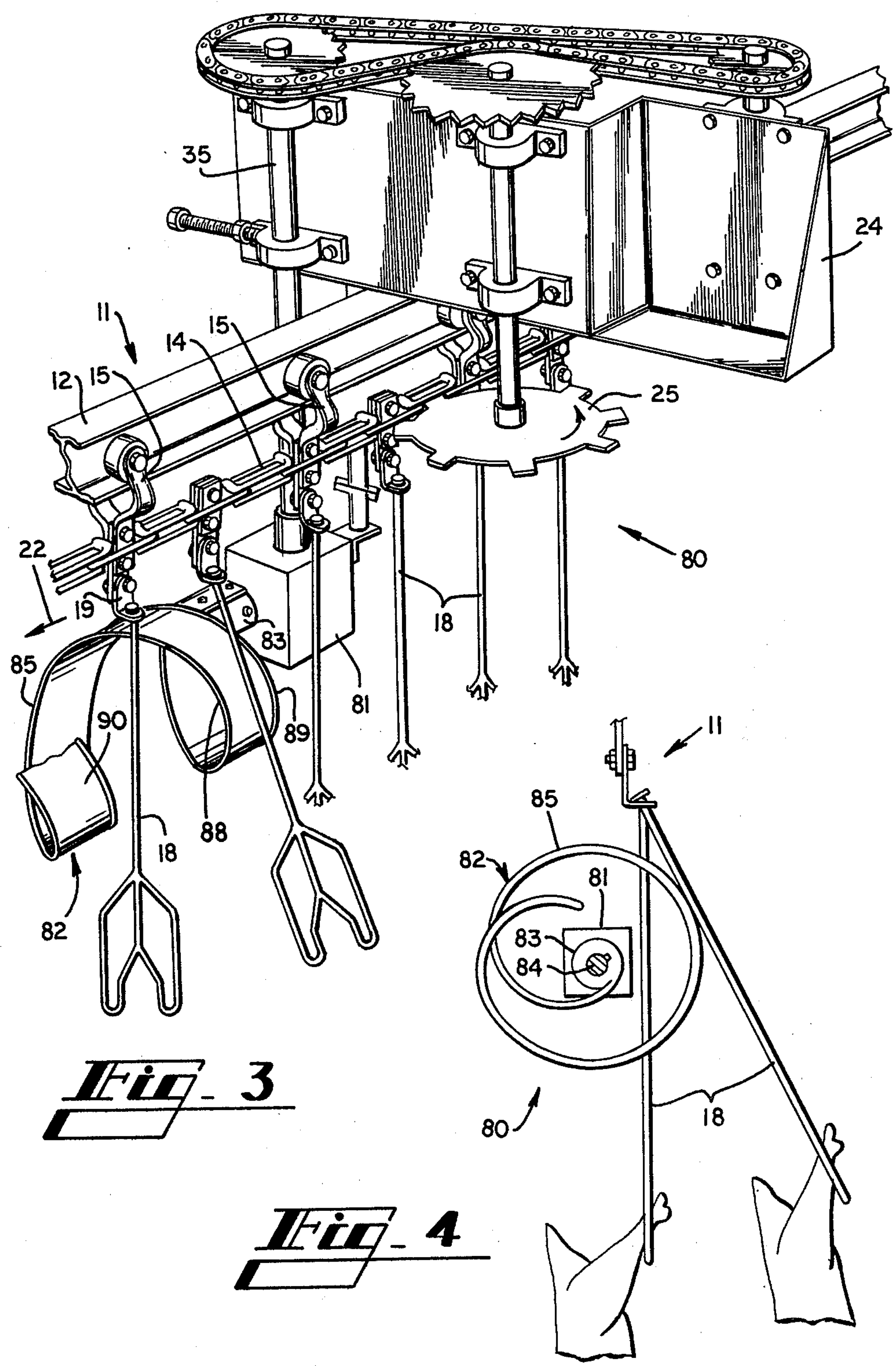
FIG. 3 is a perspective illustration of a line divider showing a second embodiment of the invention.
FIG. 4 is an end view of the helical displacement element of FIG. 3.

As illustrated in FIGS. 3–5, wherein an alternate embodiment of the invention is disclosed, a line divider 80 is placed on the poultry processing line 11 with the poultry processing line including the conveyor rail 12, conveyor chain 14, trolleys 15 and hangers or shackles 18 suspended from swivels 19. The conveyor chain 14 is driven in the direction of movement as indicated by arrow 22. Drive sprocket 25 is supported by upper support frame 24 and functions to drive driven shaft 35 in the same manner as described in FIG. 1. The lower end of driven shaft 35 is connected to gear box 81. Helical displacement element 82 includes a socket 83 mounted on the output shaft 84 of gear box 81. Helical displacement element 82 further comprises a helical engaging member 85 mounted on socket 83 and extending about the axis rotation of drive shaft 84 with a progressively increasing radius extending away from drive shaft 84 toward the central portion of the helical displacement element, and then terminating at its distal end 86 in a reduced radius. The outer surface 90 of helical engaging member 85 is substantially parallel to its axis of rotation. The leading and trailing edges of the helical engaging member 85 are formed with enlarged thickness at 88 and 89, by the welding thereto of helical-shaped rods. Thus, the convex outer surface 90 of the helical member 85 has the enlarged thicknesses 88 and 89 protruding outwardly therefrom, which reinforces the helical engaging member and tends to contain the hangers 18 therebetween.

The pitch of helical displacement element 82 as illustrated in the disclosed embodiment is equal to the distance between alternate ones of the hangers 18. Thus, when the helical displacement element 82 operates in response to the movement of the poultry processing line 11, alternate ones of the hangers 18 will be engaged by the helical displacement element 82, so that the engaged hangers are laterally displaced with respect to the conveyor line. The other alternate hangers 18 pass between the flights of the helical displacement element 82 without lateral displacement. Thus, the helical displacement element 82 and its related components function as hanger displacement means for engaging and laterally displacing one of a multiple number of a series of the hangers and the birds carried thereby on the conveyor line.

Optionally, the U-shaped guide rods 74 (FIG. 5) can be placed inside the radius of the helical displacement element 82 and alternate ones of the hangers 18 can be moved to the outside surface of outer leg 75 while the other alternate hangers can move to the inner surface of inner leg 76. Thus, the separation of hangers can be maintained beyond the end of helical displacement element 82 so that the hangers can continue to pass through the inspection station in their separated condition.

While the disclosed embodiments of the invention illustrate alternate ones of the hangers being displaced laterally from the conveyor line, it will be understood that in both embodiments of the invention the structure can be modified so as to displace one of any multiple number of a series of hangers, such as one of every three hangers, or one of every four hangers, as may be desired. This can be accomplished by spreading the paddles 66 further apart on the embodiment illustrated in FIGS. 1 and 2, and by increasing the pitch of the helical displacement element 82 in the embodiment illustrated in FIGS. 3–5.

In both embodiments the hangers 18 are urged laterally with respect to the conveyor line substantially without imparting longitudinal forces to the hangers, so that the hangers and the birds mounted thereon are not thrust longitudinally into engagement with one another, thereby minimizing the likelihood of any contact between the birds or entaglement amont the birds and their hangers.

It should be understood that the foregoing relates only to preferred embodiments of the present invention and that numerous modifications or alterations may be made therein without departing from the spirit and the scope of the invention as set forth in the appended claims.

We claim:

1. A method of dividing a line of poultry or the like supported on hangers with the hangers suspended downwardly from a conveyor and moving in alignment in series along a path through a processing plant comprising the steps of initially engaging one hanger of each of a multiple number of the hangers with an engaging surface oriented approximately parallel to the path of movement of the hangers along the conveyor line and moving the engaging surface along a path which diverges from the path of movement of the unengaged hangers while maintaining the engaging surface oriented substantially parallel to the path of movement of the unengaged hangers to urge the engaged hangers laterally with respect to the direction of movement of the hangers along the conveyor line substantially without causing the hangers or the poultry carried thereby to be deflected from the longitudinal movement with the conveyor line.

2. The method of claim 1 and wherein the step of urging the hangers laterally with respect to the direction of movement of the hangers along the conveyor line comprises progressively displacing the hangers laterally of the longitudinal direction of movement of the hangers along the conveyor line until the poultry carried by the displaced hangers is displaced a predetermined distance from the poultry carried by the other hangers that were not displaced, and further including the step of maintaining the displaced hangers and poultry carried thereby in their displaced relationship with respect to the other hangers and poultry carried thereby that were not displaced.

3. The method of claim 1 and wherein the step of engaging one hanger of each of a multiple number of the hangers comprises engaging the hangers with a helical engaging member of progressively increasing radius, and rotating the helical engaging member in timed relationship with the movement of the hangers along the conveyor line whereby the to be displaced hangers are each first engaged with the small radius portion of the helical engaging member and are progressively displaced from the path of movement of the unengaged hangers by the progressively increasing radius of the helical engaging member.

4. The method of claim 1 and wherein the steps of initially engaging and moving the hangers comprise initially engaging the hangers with an edge of a paddle member oriented substantially parallel to the longitudinal direction of movement of the hangers along the conveyor line and moving the paddle along an approximately rectilinear path that diverges laterally from the longitudinal direction of movement of the hangers along the conveyor line while maintaining the edge of the paddle member oriented substantially parallel to the longitudinal direction of movement of the hangers along the conveyor line.

5. Apparatus for dividing a line of poultry or the like supported on hangers and with the hangers suspended from and moved in spaced alignment by a conveyor along a conveyor line through a processing plant comprising drive means for engagement with the conveyor arranged to rotate in unison with the movement of the conveyor, hanger displacement means in driven connection with said drive means, said hanger displacement means including an engaging surface oriented substantially parallel to the longitudinal movement of the hangers along the conveyor line and means for moving the engaging surface laterally into engagement with respect to the hangers as the hangers move longitudinally along the conveyor line to initially displace one of a multiple number of a series of the hangers laterally with respect to the conveyor line while maintaining the engaging surface substantially parallel to the longitudinal movement of the unengaged hangers to displace the engaged hanger so as to avoid displacing the hangers or poultry carried thereby in a longitudinal direction along the conveyor line.

6. Apparatus for dividing a line of poultry or the like suspended on hangers and moved in spaced alignment by a conveyor along a conveyor line through a processing plant comprising drive means for engagement with the conveyor arranged to rotate in unison with the movement of the conveyor, hanger displacement means in driven connection with said drive means, said hanger displacement means comprising an endless conveyor chain for positioning beneath the conveyor, a plurality of paddles mounted at equally space intervals on said conveyor chain with each paddle including a hanger engaging surface, said conveyor chain including a flight which diverges at an angle laterally from the conveyor line, and said hanger engaging surface of each of said paddles formed at an angle substantially inverse to the divergent angle between the flight of said conveyor chain and the conveyor line to initially engage and displace one of a multiple number of a series of the hangers laterally with respect to the conveyor line substantially without displacing the hangers or poultry carried thereby in a longitudinal direction along the conveyor line.

7. The apparatus of claim 5 and wherein said hanger displacement means comprises a helical displacement element for positioning beneath the conveyor line and rotatable about an axis approximately parallel to the conveyor line with the pitch of the helical displacement element being equal to the distance between alternate ones of the hangers, said engaging surface comprising a helical surface of said helical displacement element of progressively increasing radius from its axis of rotation for engaging and progressively displacing alternate hangers laterally with respect to the other hangers of the conveyor so that the hangers not engaged by the helical displacement element move freely suspended between the flights of the engaging surface.

8. Apparatus for dividing a line of poultry or the like supported on hangers with the hangers suspended from and moved in spaced alignment by a conveyor along a conveyor line through a processing plant comprising a helical displacement element for positioning at the level of the hangers with its longitudinal axis extending parallel to the conveyor line, drive means for connection to the conveyor for rotating said helical displacement element about its longitudinal axis, said helical displacement element including a helical hanger displacement surface of increasing radius from its axis of rotation and oriented substantially parallel to its axis of rotation, whereby some of the hangers moved by the conveyor are engaged by the helical displacement element and moved laterally with respect to the conveyor line without urging the hangers along the conveyor line and the hangers not engaged by the helical engagement element move freely suspended between the flights of the helical displacement element.

9. Apparatus for dividing a line of poultry or the like suspended on hangers and moved in spaced alignment by a conveyor along a conveyor line through a processing plant comprising a continuous chain conveyor for positioning at the level of the hangers with one flight of the chain conveyor extending at a lateral angle with respect to the longitudinal direction of movement of the conveyor line, drive means for connection to the conveyor for driving said chain conveyor, paddle members mounted at intervals along said chain conveyor corresponding to the distance between a multiple number of a series of the hangers on the conveyor, said paddle members each including an engaging surface for engaging and displacing the hangers, the engaging surface of each of said paddles being formed at an angle with respect to said one flight of the chain conveyor which is substantially the same as the angle to be formed between said one flight of the chain conveyor and the longitudinal direction of movement of the conveyor line, whereby the paddle members move in response to the movement of the conveyor to engage one of each multiple number of hangers and to progressively displace the hanger laterally with respect to the conveyor line.

* * * * *